United States Patent
Verlinden et al.

(10) Patent No.: US 6,861,136 B2
(45) Date of Patent: Mar. 1, 2005

(54) SEGMENTED GLASS LAMINATE

(75) Inventors: Bartholomeus Verlinden, Tongeren (BE); Jean-Pierre Tahon, Langdorp (BE); Leo Vermeulen, Herenthout (BE); Wilfried Muylle, Schoten (BE); Jan Vermeiren, Edegem (BE)

(73) Assignee: Agfa-Gevaert, Mortsel (BE)

( * ) Notice: Subject to any disclaimer, the term of this patent is extended or adjusted under 35 U.S.C. 154(b) by 80 days.

(21) Appl. No.: 10/327,066

(22) Filed: Dec. 24, 2002

(65) Prior Publication Data

US 2003/0096106 A1 May 22, 2003

Related U.S. Application Data

(63) Continuation of application No. 09/272,389, filed on Mar. 19, 1999, now abandoned.

(30) Foreign Application Priority Data

Jul. 15, 1998 (EP) .............................................. 98202380

(51) Int. Cl.$^7$ ............................ B32B 3/00; B32B 23/02; B32B 27/36; D06N 7/04

(52) U.S. Cl. ...................... 428/332; 428/141; 428/189; 428/191; 428/220; 428/412; 428/426; 428/423.1; 428/425.5; 428/425.6; 428/430; 428/432; 428/435; 428/438; 428/441; 428/457; 428/473.5; 428/500

(58) Field of Search .......................... 349/73, 103, 345; 428/1.1, 1.6, 1.61, 1.62, 141, 189, 191, 220, 332, 411.1, 412, 426, 423.1, 425.5, 425.6, 430, 432, 435, 438, 441, 457, 473.5, 500, 923, 926

(56) References Cited

U.S. PATENT DOCUMENTS 4,774,143 A * 9/1988 Gondela et al. ............ 428/442
6,287,674 B1 * 9/2001 Verlinden et al. ........... 428/210

* cited by examiner

Primary Examiner—Sheeba Ahmed
(74) Attorney, Agent, or Firm—Breiner & Breiner, L.L.C.

(57) ABSTRACT

A flexible laminate is disclosed which includes a flexible support as a first layer and glass having a thickness in the range from 10 μm to 500 μm as a second layer and wherein the first or the second layer is a non-continuous, segmented layer. In the embodiment of the figure, a plastic foil 1 is provided with a plurality of thin adjacent glass segments 2, which are separated by a space 3. The laminate can be provided with functional layers, e.g. using a web coating or printing process, and can then be cut easily in the space between the segments so as to obtain a plurality of glass laminates.

18 Claims, 1 Drawing Sheet

SEGMENTED GLASS LAMINATE

DESCRIPTION

1. Field of the Invention

The present invention relates to a flexible laminate comprising a thin glass layer and a flexible supporting layer, wherein one or both layers is a non-continuous, segmented layer. The laminate is particularly suitable for use as a substrate in an electronic device such as a flat panel display, a photovoltaic cell or a light emitting diode.

2. Background of the Invention

EP-A 716 339 describes a process using a thin, flexible glass web which can be wound up around a core so as to obtain a roll of glass. The glass can be unrolled and coated with a functional layer in a continuous web coating method. Said flexible glass is characterised by (i) a thickness lower than 1.2 mm, (ii) a failure stress (under tensile stress) equal to or higher than $1 \times 10^7$ Pa and (iii) an elasticity modulus (Young's modulus) equal to or lower than $1 \times 10^{11}$ Pa. Glass according to these specifications is indeed flexible and can be wound around a core just as the commonly known plastic, metal or paper substrates. However, the probability of web breakage is high because a sharp local pressure applied on the surface of the glass web is sufficient to break the glass. Even the smallest probability of web breakage during coating is to be eliminated when carried out on an industrial scale, since the advantages associated with a continuous web coating process are then lost due to the interruption of the process.

The above problem is also recognised in WO 87/06626, wherein it is stated that thin glass having a thickness of 1 to 15 mils breaks almost immediately when rolled up. As a solution to protect a glass web which is wound around a core, WO 87/06626 describes the use of an interleave which prevents glass-to-glass contact. Said interleave is a non-abrasive material such as an embossed polyester film. However, when the glass web is unwound from its core, the interleave is separated from the glass and from then on, the same problems arise as discussed above with regard to EP-A 716 339.

EP-A 669 205, WO98/6455 filed o the 7th of Oct. 1998 and WO98/5748 filed on the 9th of Sep. 1998 describe a laminate wherein a glass layer is adhered to a support such as a plastic foil. When a thin glass is used, e.g. a glass as described in EP-A 716 339, the glass/plastic laminate is flexible and can be wound around a core, enabling the use of web or roll coating methods for applying functional layers. Such glass laminates combine the advantageous properties of glass and plastics and can be used as a thermally and dimensionally stable substrate for making electronic devices such as flat panel displays, photovoltaic cells or light emitting diodes. The devices which are obtained using such glass/plastic laminates as a substrate are characterized by a lower weight than full-glass based devices and by a lower probability of breakage of the substrate during handling or upon dropping the device. In addition, such devices are characterized by a much longer lifetime than plastic-based devices because the diffusion of gases such as oxygen and water vapor, which may degrade the functional layers, is efficiently reduced by the presence of the glass layer.

Two problems are associated with these glass laminates. In order to obtain a web of a flexible glass laminate, it is necessary to laminate a web of flexible glass to a web of a flexible support such as a plastic foil. As described above, the handling of a flexible glass is liable to a high risk of breakage, which reduces the yield of the lamination process.

Another problem is associated with the cutting of the glass laminates. At present, flat panel displays such as LCDs are being manufactured from substrates having a large size up to 500×400 or even 650×550 mm. After assembling the mother panel, which is a sandwich of two glass subtrates, each provided with functional layers, the substrates are cut so as to obtain from two to nine modules (displays cells) out of one panel. Using glass/plastic laminates as substrate requires complicated cutting tools, especially when one takes into account that the substrates of a LCD are typically being cut asymmetrically, i.e. the one substrate is cut at a different location than the other so as to obtain a Z-shaped edge. Some cutting methods, e.g. grinding, cannot be used for cutting a display panel because the debris generated may seriously affect the functioning of the device, which typically is manufactured in stringent clean room conditions. Besides the specific problems associated with display modules, glass laminates are difficult to cut per se because of the different mechanical properties of glass and a support such as a plastic foil and, as a result, complex cutting tools are required. Some solutions for cutting laminated glass from both sides simultaneously have been described in U.S. Pat. Nos. 4,558,622; 5,704,959; 5,475,196 and 4,739,555. However, these solutions are not applicable for cutting an assembled display cell which comprises a sandwich of two glass laminates as a substrate.

Segmented glass/support laminates, wherein one of the layers is a non-continuous layer consisting of adjacent segments, have been disclosed in the prior art. U.S. Pat. No. 5,558,827 describes a simulated leaded glass comprising a tempered glass base sheet that is provided with a plurality of plastic window pane replicas, separated by simulated lead rods. U.S. Pat. No. 4,774,143 describes a laminated window structure having a layer of discrete glass segments in order to avoid crack propagation upon mechanical impact. Both these glass laminates are non-flexible architectural applications, which are not suitable for making electronic devices such as a flat panel display, a photovoltaic cell or a light emitting diode.

SUMMARY OF THE INVENTION

It is a first object of the present invention to provide a flexible thin-glass laminate which can be provided with one or more functional layers using a web coating or printing method and which can be cut easily so as to obtain sheets of thin-glass laminate that can be used as a substrate in an electronic device, e.g. a flat panel display, a photovoltaic cell or a light emitting diode. This object is realised by the laminate defined in claim 1. The glass layer has excellent barrier properties and a low thickness so that low-weight devices having an improved life-time are obtained.

It is another object of the present invention to provide a method for making a flexible thin-glass laminate with a high yield. This object is realized by the claimed invention.

Specific features for preferred embodiments of the invention are disclosed in the dependent claims. Further advantages and embodiments of the present invention will become apparent from the following description.

DETAILED DESCRIPTION OF THE INVENTION

Figure 1:
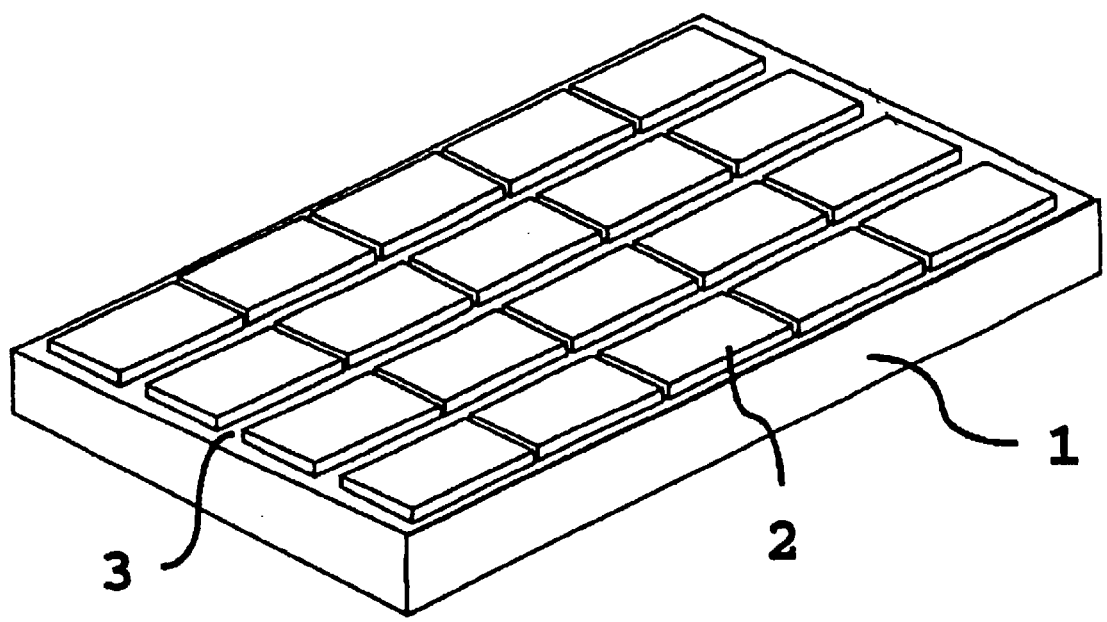
FIG. 1 is a schematic representation of a flexible laminate according to the present invention.

The laminate of the present invention comprises a flexible support as a first layer and a thin glass layer as a second layer, wherein one of said layers is a non-continuous layer comprising a plurality of adjacent or adjoining segments. The non-glass layer may be referred to herein as "the support".

The term adjacent is used herein in the meaning of "lying nearby but not touching" and the term adjoining is used herein in the meaning of "touching at a bounding or dividing line". Contrary to adjacent segments, which are mutually spaced, adjoining segments are touching, e.g. a glass laminate wherein the glass layer is fractured and thus comprises a plurality of touching segments, bounded by a crack line. In a highly preferred embodiment, the segments are adjacent segments which are mutually spaced. It shall be understood that laminates wherein one of the constituting layers contains pre-formed grooves which do not penetrate throughout the layer, e.g. a glass sheet which can easily be broken into distinct segments because of the presence of such pre-formed grooves, are regarded equivalent to "a plurality of adjoining segments" and laminates comprising such layers are embraced by the scope of the appending claims.

In the embodiment of FIG. 1, a plastic support 1 is provided with a plurality of thin, adjacent glass sheets 2 (twenty distinct sheets shown). The glass sheets are separated by a space 3, so the laminate can easily be cut along this space using common tools such as a knife, scissors, or by local melting of the support.

According to another embodiment of the present invention, the laminate may comprise continuous thin-glass layer which is provided with a plurality of adjacent or adjoining segments of the support material such as a plastic foil. Again, such a laminate can be cut easily at the space or boundary between the segments using known glass cutting tools, e.g. a diamond cutter, a grinding wheel, a laser, etc. Applying the composition of this embodiment to FIG. 1, a thin glass sheet 1 is provided with a plurality of adjacent sheets of the support and this laminate can be cut easily in space 3 using glass cutting tools and methods.

The segments in the laminate of the present invention have a controlled size and geometry, i.e. are not obtained randomly such as the fragmented pattern that would result upon shattering the glass layer with the mechanical impact of e.g. a hammer. In a preferred embodiment, the segments have a square or rectangular sheet-like geometry, suitable to be used as a substrate for making electronic devices such as flat panel displays, photovoltaic cells or light emitting diodes, All the segments preferably have an identical size and/or an identical geometry.

According to the present invention, a laminate as described above can be made by positioning a plurality of sheets consisting of a first material with respect to a layer consisting of a second material and then laminating said sheets to said layer so as to obtain a non-continuous layer comprising a plurality of adjacent of adjoining segments. As an example, thin glass sheets may be positioned with respect to a web of a plastic foil, which may have been provided with an adhesive layer, and then laminated either simultaneously or consecutively to the plastic foil so as to obtain a layer consisting of a plurality of mutually spaced glass segments.

According to another embodiment of the method for making a laminate according to the present invention, a first layer consisting of a first material is laminated to a second layer consisting of a second material and one of the layers of the laminate thus obtained is then cut into segments, e.g. using one of the tools mentioned above. For example, a large glass sheet or web may be laminated to a plastic foil of about equal size and the glass or the plastic layer is then cut into distinct segments.

The glass used in the present invention is a flexible glass having a thickness of not less than 10 $\mu$m and not more than 500 $\mu$m. For some applications, a thickness lower than 350 $\mu$m or even lower than 200 $\mu$m may be preferred. For lower brittleness a thickness of not less than 30 $\mu$m or even not less than 50 $\mu$m may be preferred.

The glass may be e.g. sodium float glass, chemically strengthened glass or borosilicate glass. Such glass can be made by squeezing semi-molten glass between metal rollers to produce a thin web. U.S. Pat. No. 4,388,368 describes the following method to produce flexible glass sheets. A soda lime glass ($Na_2O.CaO.SiO_2$=15:13:72 by weight) molten at 1550° C. is drawn and rolled. The glass thus formed is supported by clips at both ends and heated at about 350° C. Thereafter the glass sheet is stretched to from 1.05 to 10 times the area of the original sheet while blowing a hot blast of air at a temperature lower than the aforesaid heating temperature onto the glass sheet, e.g. about 700° C. In this way, the glass sheet is cooled faster at thin portions, and thereby the thickness of the glass sheet thus stretched is maintained uniform. A similar method has been described in JP-A 58,095,622. In another method, described in JP-A 58,145,627, a web of molten glass is pulled upward and immediately drawn horizontally using large rollers onto the surface of a molten metal bath, followed by gradual cooling. The glass thus obtained has improved flatness.

Chemically strengthened float glass is known to have greater strength than regular float glass. Chemically strengthened glass is glass wherein at both surface layers the original alkali ions are at least partially replaced by alkali ions having a larger radius. In chemically hardened sodium lime silica glass, the sodium ions near the surface of the glass are at least partially substituted by potassium and in chemically hardened lithium lime silica glass, the lithium ions near the surface are at least partially substituted by sodium and/or potassium. Known methods for producing chemically strengthened glass are processes wherein glass is exposed to ion exchange conditions as described in e.g. JP-A 56,041,859, GB 1,208,153 and U.S. Pat. No. 3,639,198. More details about chemical strengthening of glass are given in e.g. "Glass Technology", Vol. 6, No. 3, page 90–97, June 1965.

Highly preferred glass for use in the present invention is thin borosilicate glass which is very strong compared to regular sodium float glass. Borosilicate glass comprises $SiO_2$ and $B_2O_3$. The detailed composition of some borosilicate glass types has been described in e.g. U.S. Pat. Nos. 4,870,034, 4,554,259 and 5,547,904.

Flexible, thin glass is commercially available, e.g. from Pilkington and Corning. Preferred thin borosilicate glass for use in the method of the present invention is commercially available from e.g. Deutsche Spezialglass AG (Desag, Germany), a Schott Group company, as types AF45 and D263 with a thickness as low as 30 $\mu$m. According to the technical brochure "Alkali Free and Low Alkali Thin Glasses", subtitle "AF45 and D263: Thin Glasses for Electronic Applications", published by Desag in 1995, thin borosilicate glass is available in a thickness of 30 $\mu$m, 50 $\mu$m, 70 $\mu$m, 100 $\mu$m, 145 $\mu$m, 175 $\mu$m, 210 $\mu$m, 300 $\mu$m, 400 $\mu$m, 550 $\mu$m and 700 $\mu$m.

The flexible support used in the method of the present invention has preferably a thickness of less than 500 $\mu$m, more preferably less than 250 $\mu$m and most preferably less than 100 $\mu$m. It may be a metal foil, paper, or a plastic formed of one or more material(s) selected from the group consisting of polyether resin, cellulose resins such as cellulose diacetate, cellulose triacetate and butyl acetate, polyethersulfone (PES) resin, acrylic resin, poly(ethylene terephthalate) (PET) resin, phenoxy resin, phenoxy-urethane resin, urethan resin, polyether-ketone resin, polyether-etherketone resin, polyimide-amide resin, polycarbonate (PC) resin, polysulfone resin, polyethylene resin, or polypropylene resin. Also copolymers can be used, e.g. a copolymer of acrylonitrile, styrene and butadiene or cyclo-olephine copolymers (COCs) such as copolymers comprising (poly) dicyclopentadieen (PDCP). PET, PC, PES and PDCP are highly preferred. PES and PDCP are especially preferred for applying functional layers by high temperature processes. Alternatively, the support may consist of multilayers formed of some materials of the above mentioned resins.

Methods for laminating the glass to the support are well known. Both layers may be laminated without the use of an adhesive layer by so-called vacuum lamination. In order to obtain an effective bond between the glass layer and the support by vacuum lamination, both these materials are preferably characterised by a low surface roughness, e.g. the support preferably does not contain a so-called spacing agent, which is often introduced in plastic foils or in coatings on foils to prevent sticking.

In addition to vacuum lamination, the use of double-sided adhesive tape or an adhesive layer, obtained by applying e.g. a hotmelt, a pressure- or thermo-sensitive adhesive, or a UV or electron-beam curable adhesive. Alternatively a slightly moistened gelatine layer can also be used as an adhesive layer. More information about suitable adhesive layers is described in WO98/6455, filed on the 7th of Oct. 1998, and WO98/5748, filed on the 9 th Sep. 1998. The adhesive layer may be applied either to the glass sheet, to the support, or to both and may be protected by a stripping layer, which is removed just before lamination. Polyethylene is a highly preferred adhesive, which can be applied as a foil between the glass and the support.

The flexible laminates according to the present invention may be provided in sheet or in web form and may be wound up around a core. A laminate, wherein the glass layer is the non-continuous layer, has improved flexibility compared to the thin-glass laminates disclosed in the prior art because, at the boundary between adjacent or adjoining glass segments, the flexibility of the laminate is only determined by the support.

Preferably, the laminates are provided with a functional layer before being cut into separate substrates, e.g. for use in an electronic device such as a flat panel display, a photovoltaic cell or a light emitting diode. The latter method is especially preferred because it enables industrial roll-to-roll manufacturing of devices such as flat panel displays which may significantly reduce the cost of the process compared to the batch methods that are being used at present. A functional layer can be applied on the glass or on the support side of the laminate by sputtering, by physical vapour deposition, by chemical vapour deposition, as well as by coating from a liquid coating solution such as spin coating, dip coating, rod coating, blade coating, air knife coating, gravure coating, reverse roll coating, extrusion coating, slide coating and curtain coating. An overview of these coating techniques can be found in "Modern Coating and Drying Technology", Edward Cohen and Edgar B. Gutoff Editors, VCH publishers, Inc., New York, N.Y., 1992. A plurality of layers may be coated simultaneously, e.g. by coating techniques such as slide coating or curtain coating.

After applying one or more functional layers, the laminate may be rolled up around a core or may be cut directly into separate substrates. Alternatively, the laminates may be cut into separate substrates without being provided with a functional layer and such a layer then may be applied in a batch coating method (sheet by sheet). The functional layer can also be applied on the glass or the support before laminating.

More details of functional layers that may be applied to the flexible laminate of the present invention will now be given, more particularly functional layers which are used in electric and electronic devices such as a flat panel display (FPD), a photovoltaic cell (often called solar cell), or a light emitting diode (LED), especially organic LEDs (OLEDs). It shall be understood, though, that the flexible laminate of the present invention may also be used for other applications than the electronic devices mentioned herein.

A highly preferred FPD is a liquid crystal display (LCD). A typical LCD cell comprises a module of two parallel substrates which each carry on their inner surface an electroconductive layer and a liquid crystal orientation layer, also called alignment layer. In colour LCDs, one of the substrates is also provided with a colour filter. These electroconductive layers, alignment layers and colour filters shall be regarded as a functional layer which may be applied to the laminate of the present invention.

A liquid crystal orientation layer typically consists of a polyimide film which is mechanically rubbed so that the director of the liquid crystal molecules aligns itself with the rubbing direction. More information can be found in e.g. "Surface alignment of liquid crystals by rubbed polymer layers", by A. Mosley and B. M. Nicholas, published in Displays, pp. 17–21, January 1987.

Coatings consisting of tin oxide, indium oxide or tin-doped indium oxide (ITO) are widely used as electroconductive layers in FPDs because these materials possess high transparency in the visible spectrum combined with a fairly low electrical resistivity. ITO can be coated by e.g. RF-sputtering from an ITO target, described by J. L. Vossen in Physics of thin films, pp. 1–71, Academic Press, New York (Plenum Press, 1977) or reactive DC magnetron sputtering from an indium-tin target, described in Thin Solid Films, Vol. 83, pp. 259–260 (1981) and Vol. 72, pp. 469–474 (1980), followed by thermal treatment.

Also functional layers of organic conductive polymers, which are more resistant to bending than inorganic substances such as ITO, can be used. DE-A-41 32 614 discloses the production of film-forming, electroconductive polymers by anodic oxidation of pyrroles, thiophenes, furans or aromatic amines (or their derivatives) is effected with a sulphone compound present in the electrolyte solution. The preparation of electroconductive polythiophenes and polypyrroles is described in U.S. Pat. Nos. 5,254,648 and in 5,236,627 respectively. In EP-A-440 957 a method for preparing polythiophene in an aqueous environment and applying polythiophene from an aqueous solution has been described. Such a solution is up until now mostly used in photographic materials as disclosed in e.g. U.S. Pat. Nos. 5,312,681, 5,354,613 and 5,391,472. In EP-A-686 662 it has been disclosed that layers of polythiophene coated from an aqueous composition could be made with high conductivity.

The functional layer which may be applied onto the laminate of the present invention may also be a non-continuous functional layer, e.g. electroconductive patterns defining electronic components such as the rows and columns used for multiplex-addressing in passive-matrix LCDs or the thin-film-transistors (TFTS) and pixel electrodes used in active-matrix LCDs. For the application of such patterns, photolithographic as well as printing techniques can be used. The non-continuous layer can also be formed on the laminate by other techniques, e.g. lamination followed by delamination, ink jet, toner jet, electrophotography, or thermosublimation.

The colour filters, which similarly to the above electroconductive patterns and layers are not only used in LCDs but also in other FPD types, are another example of a non-continuous functional layer that may be applied on the laminate of the present invention. The colour filter can be a gelatine-based filter, a vacuum deposited filter, a printed filter, an interference filter, an electrolytically deposited filter, etc. Some suitable examples can be found in e.g. "High quality organic pigment colour filter for colour LCD" by T. Ueno, T. Motomura, S. Naemura, K. Noguchi and C. Tani in Japan Display, 1986, pp. 320–322; "An active matrix colour LCD with high transmittance using an optical interference filter" by T. Unate, T. Nakagawa, Y. Matsushita. Y. Ugai and S. Acki in SID Int. Display Conf., pp. 434–437, 1989; "New process for preparing multi-colour filters for LCDs" by A. Mataumura, M. Ohata and K. Ishikawa in SID Int. Display Conf., pp. 240–2443, 1990; Eurodisplay '87 proceedings, pp. 379–382 and 395–396: EP-B 396 824 and EP-A 615 161.

The laminate of the present invention may be used in the manufacturing of passive-matrix LCDs as well as active-matrix LCDs such as thin-film-transistor (TFT) displays. Other particular examples are twisted nematic (TN), supertwisted nematic (STN), double supertwisted nematic (DSTN), retardation film supertwisted nematic (RFSTN), ferroelectric (FLC), guest-host (GH), polymer-dispersed (PF), polymer network (PN) liquid crystal displays, and so on.

Emissive FPD types which may benefit from the present invention are e.g. plasma displays (PDs), field emission displays (FEDs) and so-called organic light-emitting displays (OLEDs). In such electroluminescent displays, the electroconducting layers or patterns on at least one of the substrates may be replaced by a non-transparent material, e.g. silver or nickel.

A typical PD comprises two substrates which enclose a gas-filled volume, the gas being typically one of the noble gases or a mixture thereof. By charging the electrodes present in the gas-filled cavity with a high voltage, typically about 100 V, a plasma discharge is generated which emits UV light. In many designs, the discharges are confined to separate cells (pixels) formed by walls of insulating material between the substrates. The UV light may excite phosphors which are present on the cell walls so as to obtain colour images. To eliminate the orange light which may also be emitted by the plasma, colour filters are also used in PDs. The electroconductive layers or patterns may be shielded from the plasma by applying a dielectric protecting layer, which comprises e.g. lead oxide or magnesium oxide. Also said insulating walls, phosphors, colour filters and dielectric protecting layers shall be regarded as a (non-continuous) functional layer which may be applied on the laminate of the present invention.

FEDs also comprise two substrates which are provided with functional layers. In addition to the electroconductive layers and patterns known from LCDs and PDs, one of the substrates of a FED is provided with a large number of microtips, consisting of e.g. molybdenum, which each act as a microscopic electron gun. When charged up to a high voltage from 200 to 800 V, these microtips emit an electron beam towards a phosphor layer on the opposite substrate which typically carries an ITO layer as a counter electrode. The electroconductive layers and patterns, microtips and phosphor layers in FEDs shall also be regarded as functional layers which may be applied on the laminate of the present invention.

OLEDs are electroluminescent devices wherein electrons and holes are injected from a cathode and anode respectively into an electroluminescent material, e.g. an electroluminescent polymer such as poly(p-phenylenevinylene) (PPV) and its derivatives, fluorene derivatives or distyrylbenzene compounds, and then recombine to an exciton which relaxes to the ground state by radiative decay. Some particular examples have been disclosed in e.g. U.S. Pat. Nos. 5,247, 190 and 5,401,827. Detailed information on OLEDs is published in "Organic electroluminescent materials and devices", edited by S. Miyata and H. S. Nalwa, Gordon and Breach Publishers (1997); "Organic Electroluminescent Devices", Science, Vol. 273, p. 884 (16 Aug. 1996); Philips Journal of Research, Vol. 51, No. 4, p. 518–524 (1998): Philips J. Res., vol. 51, p. 511–525 (1998); and in Nature, vol. 347, p. 539 (1990).

In a typical OLED the following functional layers are present between two substrates:

- a reflecting cathode, e.g. a low-work function metal layer such as evaporated Ca.
- an electroluminescent layer, e.g. PPV; other suitable electroluminescent compounds are described in e.g. "Organische Leuchtdioden", Chemie in unserer Zeit, 31. Jahrg. 1997, No. 2, p. 76–86.
- an hole-injection layer, e.g. an organic electroconductive layer.
- an transparent anode, e.g. an ITO layer Also these layer shall be regared as a functional layer which may be applied on the laminate of the present invention.

Although the OLED above comprises two inorganic electrodes, a preferred device is fully composed of organic layers (excluding the glass sheets) as such layers are resistant to bending, distinguished from brittle inorganic layers such as ITO. Such devices may comprise e.g. all-organic thin-film-transistors as described in Adv. Mater. vol. 2, no. 12, p. 592 (1990) and the organic conducting layers described above.

In addition to the above devices, other suitable examples of electronic devices which may benefit from the present invention are electrolytic capacitors, circuit boards, electrochromic displays, an electronic book such as the one described in WO 97/04398 or a photovoltaic device such as an organic solar cell which comprises a similar structure as the OLED described above, with the proviso that the electroluminescent layer is replaced by a composition wherein photo-induced electron transfer occurs between an electron-donor and an acceptor.

What is claimed is:

1. A laminate in sheet or web form windable around a core, the laminate comprising a support windable around a core as a first layer and glass having a thickness in the range from 10 $\mu$m to 500 $\mu$m as a second layer, wherein the first or the second layer is a non-continuous layer which comprises a plurality of adjacent or adjoining segments having a controlled size and geometry and the glass is chemically hardened glass.

2. A laminate in sheet or web form windable around a core, the laminate comprising a metal foil, paper or plastic support as a first layer and glass having a thickness in the range from 10 $\mu$m to 500 $\mu$m as a second layer, wherein the first or the second layer is a non-continuous layer which comprises a plurality of adjacent or adjoining segments having a controlled size and geometry, wherein the laminate is provided with a functional layer.

3. A laminate in sheet or web form windable around a core, the laminate comprising a support as a first layer and glass having a thickness in the range from 10 μm to 500 μm as a second layer, whrein the first or the second layer is a non-continuous layer which comprises a plurality of adjacent or adjoining segments having a controlled size and geometry, wherein the laminate is provided with a functional layer selected from the group consisting of an electroconductive layer, a liquid crystal orientation layer, a colour filter layer, a phosphor layer, a large number of microtips, an electroluminescent layer, a hole-injection layer, a transparent anode and a reflecting cathode.

4. A laminate in sheet or web form windable around a core, the laminate comprising a metal foil, paper or plastic support windable around a core as a first layer and borosilicate glass having a thickness in the range from 10 μm to 500 μm as a second layer, wherein the second layer is a non-continuous layer which comprises a plurality of adjacent or adjoining segments having a controlled size and geometry.

5. Laminate according to claim 4, wherein the glass has a thickness in the range from 30 μm to 350 μm.

6. Laminate according to claim 4, wherein the glass has a thickness in the range from 50 μm to 200 μm.

7. Laminate according to claim 4, wherein an adhesive is present between the first and the second layer.

8. Laminate according to claim 4, wherein the support windable around a core is plastic formed of one or more material(s) selected from the group consisting of polyether resin, cellulose resins, polyether-sulfone, acrylic resin, poly (ethylene terephthalate) resin, phenoxy resin, phenoxy-urethane resin, urethan resin, polyether-ketone resin, polyether-ether-ketone resin, polyimideamide resin, polycarbonate resin, polysulfone resin, polyethylene resin, polypropylene resin, a copolymer of acrylonitrile, styrene and butadiene and cyclo-olefin copolymers.

9. A laminate in sheet or web form windable around a core, the laminate comprising a support windable around a core as a first layer and glass having a thickness in the range from 10 μm to 500 μm as a second layer, wherein the first layer is a non-continuous layer which comprises a plurality of adjacent or adjoining segments having a controlled size and geometry and said first layer is a metal foil, paper or plastic.

10. Laminate according to claim 9, wherein the glass has a thickness in the range from 30 μm to 350 μm.

11. Laminate according to claim 9, wherein the glass has a thickness in the range from 50 μm to 200 μm.

12. Laminate according to claim 9, wherein an adhesive is present between the first and the second layer.

13. Laminate according to claim 9, wherein the support windable around core is metal foil, paper or plastic.

14. Laminate according to claim 9, wherein the support windable around a core is plastic formed of one or more material(s) selected from the group consisting of polyether resin, celluose resins, polyether-sulf one, acrylic resin, poly (ethylen terephthalate) resin, phenoxy resin, phenoxy-urethane resin, urethane resin, polyether-ketone resin, polyether-etier-ketone resin, polyimideamide resin, polycarbonate resin, polysulfone resin, polyethylene resin, polypropylene resin, a copolymer of acrylonitrile, styrene and butadien and cyclo-olefin copolymers.

15. A method of making a laminate in sheet or web form windable around a core, the laminate having a non-continuous layer which comprises a plurality of adjacent or adjoining segments having a controlled size and geometry, said method comprising the steps of positioning a plurality of sheets consisting of a first material with respect to a layer consisting of a second material;

laminating said sheets to said layer;

wherein the first or the second material is borosilicate glass having a thickness in the range from 10 μm to 500 μm and the first or the second material which is not said borosilicate glass is metal foil, paper or plastic.

16. A method of making a laminate in sheet or web form windable around a core, the laminate having a non-continuous layer which comprises plurality of adjacent or adjoining segments having a controlled size and geometry, said method comprising the steps of laminating a first layer consisting of a first material to a second layer consisting of a second material;

cutting the first or the second layer into segments;

wherein the first or the second material is borosilicate glass having a thickness in the range from 10 μm to 500 μm and the first or the second material which is not said borosilicate glass is metal, foil, paper or plastic.

17. A method of making a flat panel display, a photovoltaic cell or a light emitting diode comprising the step of providing with a functional layer a laminate in sheet or web form windable around a core, the laminate comprising a metal foil, paper or plastic support as a first layer and borosilicate glass having a thickness in the range from 10 μm to 500 μm as a second layer, wherein the first or the second layer is a non-continuous layer which comprises a plurality of adjacent or adjoining segments having a controlled size and geometry.

18. A method of making a flat panel display, a photovoltaic cell or a light emitting diode comprising the step of providing with a functional layer selected from the group consisting of an electroconductive layer, a liquid crystal orientation layer, a colour filter layer, a phosphor layer, a large number of microtips, an electroluminescent layer, a hole-injection layer, a transparent anode and a reflecting cathode, a laminate in sheet or web form windable around a core, the laminate comprising a support as a first layer and glass having a thickness in the range from 10 μm to 500 μm as a second layer, wherein the first or the second layer is a non-continuous layer which comprises a plurality of adjacent or adjoining segments having a controlled size and geometry.

* * * * *

UNITED STATES PATENT AND TRADEMARK OFFICE
CERTIFICATE OF CORRECTION

PATENT NO. : 6,861,136 B2
DATED : March 1, 2005
INVENTOR(S) : Bartholomeus Verlinden et al.

It is certified that error appears in the above-identified patent and that said Letters Patent is hereby corrected as shown below:

Column 1,
Line 43, "filed o the 7th" should read -- filed on the 7th --.

Column 7,
Line 21, "A. Mataumura" should read -- A. Matsumura --.

Column 9,
Line 7, "whrein" should read -- wherein --.
Line 34, "urethan resin" should read -- urethane resin --.
Line 58, "polyether-sulf one" should read -- polyether-sulfone --.

Column 10,
Line 1, "(ethylen terephthalate)" should read -- (ethylene terephthalate) --.
Line 3, "polyether-etier-ketone" should read -- polyether-ether-ketone --.
Line 6, "butadien" should read -- butadiene --.
Line 22, "comprises plurality" should read -- comprises a plurality --.

Signed and Sealed this

Twenty-fifth Day of October, 2005

JON W. DUDAS
*Director of the United States Patent and Trademark Office*